Patented Apr. 25, 1933

1,905,316

UNITED STATES PATENT OFFICE

KARL STREITWOLF, OF FRANKFORT-ON-THE-MAIN, ALFRED FEHRLE, OF BAD SODEN-ON-THE-TAUNUS, HANS HILMER, OF FRANKFORT-ON-THE-MAIN, AND HANS SCHMIDT, OF WUPPERTAL-VOHWINKEL, GERMANY, ASSIGNORS TO WINTHROP CHEMICAL COMPANY, INC., OF NEW YORK, N. Y., A CORPORATION OF NEW YORK

WATER-SOLUBLE COMPLEX COMPOUNDS OF HEAVY METALS WITH 3.4-DIHYDROXY-BENZENE ARSONIC ACID

No Drawing. Application filed August 18, 1931, Serial No. 557,946, and in Germany October 17, 1930.

The present invention relates to water-soluble complex compounds of heavy metals with 3.4-dihydroxybenzene-arsonic acid.

We have found that 3.4-dihydroxybenzene-1-arsonic acid can easily be transformed into water-soluble complex compounds with metals or metalloids. The process may be carried out by causing soluble salts of the arsonic acids, preferably in an aqueous solution, to react with the oxides or hydroxides of heavy metals or metalloids, such as antimony, bismuth, arsenic or copper. The hydroxides of the metals may be added or may be produced in the reaction mixture by adding solutions of salts of metals or metalloids to the solution of the salts of the arsonic acids and further adding alkalies or bases in order to form the hydroxides of the metals which then react with the arsonic acids. The new complex compounds can be isolated from the solution thus obtained by concentrating the solution, for instance, by evaporating in a vacuum and then pouring the solution thus concentrated into an organic solvent, as for instance, acetone. Thereby the new compound is precipitated and can be separated from the organic solvent.

The new products are useful therapeutics.

The following examples serve to illustrate the invention, but they are not intended to limit it thereto.

1. 25.6 grams ($\frac{1}{10}$ mol.) of the sodium salt of pyrocatechol-monoarsonic acid (3.4-dihydroxy-benzene-1-arsonic acid) are dissolved in 200 cc. of water. The hot solution is then mixed with a suspension of copper hydroxide (prepared from copper sulfate solution by precipitation with caustic soda, filtering the precipitate, washing it and stirring it with water) as long as the latter is dissolved. During the operation the solution is kept neutral by addition of caustic soda solution. The green solution is filtered and concentrated in a vacuum; by pouring the concentrated solution into acetone the copper complex salt can be separated. For purification it is dissolved in methyl alcohol and precipitated, after filtration, by means of ether. The complex salt thus made is a green powder which dissolves in water to a green solution. Copper sulfide can be precipitated from the solution by means of ammonium sulfide. On addition of dilute alkali lye the solution remains clear.

2. 25.6 grams ($\frac{1}{10}$ mol.) of the sodium salt of pyrocatechol-arsonic acid are dissolved in 200 cc. of water, the solution is gently heated with an aqueous suspension of the equimolecular quantity of freshly precipitated bismuth hydroxide while it is kept neutral with caustic soda solution. The undissolved matter is filtered by suction, the filtrate is concentrated in a vacuum and this concentrated solution is introduced, while stirring, into acetone. The bismuth complex salt separates. A nearly white water-soluble powder is formed. Its solution is not precipitated by addition of alkali. Hydrogen sulfide precipitates bismuth sulfide.

3. 25.6 grams ($\frac{1}{10}$ mol.) of the sodium salt of pyrocatechol-arsonic acid are dissolved in 200 cc. of water and the solution is heated together with an aqueous suspension of the equimolecular quantity of freshly precipitated antimony hydroxide and is kept neutral with caustic soda solution. The undissolved matter is filtered by suction and the filtrate is concentrated in a vacuum. On pouring this solution into acetone the antimony salt separates in the form of a nearly white powder which easily dissolves in water. On addition of ammonium sulfide, antimony sulfide is precipitated, whereas alkali does not cause a precipitation.

4. 25.6 grams of the ammonium salt of pyrocatechol-arsonic acid are dissolved in 200 cc. of water, the solution is heated with the equimolecular quantity of stannous hydroxide suspended in water and is kept neutral with ammonia. The product is further worked up as indicated in the foregoing examples. The tin salt is a nearly white water-soluble powder. Tin sulfide is precipitated from the solution by addition of hydrogen sulfide.

5. 25.6 grams of the sodium salt of pyrocatechol-arsonic acid are dissolved in 200 cc. of water and the solution is boiled for some time with the equimolecular quantity of molybdenum oxide. After neutralization with caustic soda solution, the molybdenum complex salt is isolated as indicated in the preceding examples. The molybdenum complex salt is brownish yellow and dissolves in water.

6. 25.6 grams of the sodium salt of pyrocatechol-arsonic acid are dissolved in 200 cc. of water and the solution is heated together with an aqueous suspension of the equimolecular quantity of freshly precipitated aluminium hydroxide. The liquid is rendered neutral, filtered and the complex salt is isolated by pouring the concentrated solution into acetone. It is a white, water-soluble powder.

7. 25.6 grams of the sodium salt of pyrocatechol-arsonic acid are dissolved in 200 cc. of water and heated with the equimolecular quantity of cobaltic hydroxide suspended in water. After the solution has been worked up as in the preceding examples, a grey, water-soluble substance is obtained.

8. On gently heating an aqueous solution of the sodium salt of pyrocatechol-arsonic acid (25.6 grams) with an aqueous suspension of the equimolecular quantity of nickel hydroxide, there is formed in the same manner as in Example 7 the light grey nickel complex salt. It easily dissolves in water.

9. 25.6 grams of the sodium salt of pyrocatechol-arsonic acid are dissolved in 200 cc. of water, then boiled for a prolonged time with arsenious acid (8 grams) and kept neutral with caustic soda solution. After cooling the whole is filtered, concentrated and the arsenic complex salt is precipitated by pouring the concentrated solution into acetone. It is a white water-soluble powder.

In the following claims the term heavy "metals" comprises also the metals of the nitrogen group, the so-called metalloids, e. g. arsenic, antimony and bismuth.

We claim:

1. Complex heavy metal salts of 3.4-dihydroxybenzene-1-arsonic acid, being therapeutically valuable, water-soluble powders.

2. The complex bismuth salt of 3.4-dihydroxybenzene-1-arsonic acid, being a therapeutically valuable nearly white, water-soluble powder from the aqueous solution of which no bismuth hydroxide is precipitated by means of alkali.

3. The complex antimony salt of 3.4-dihydroxybenzene-1-arsonic acid, being a therapeutically valuable nearly white, easily water-soluble powder, from the aqueous solution of which no sulfide of antimony is precipitated by addition of ammonium hydrosulfide.

4. The complex copper salt of 3.4-dihydroxybenzene-1-arsonic acid, being a therapeutically valuable green powder which dissolves in water to a green solution from which no copper hydroxide is precipitated by means of dilute alkali.

In testimony whereof, we affix our signatures.

KARL STREITWOLF.
ALFRED FEHRLE.
HANS HILMER.
HANS SCHMIDT.